(12) United States Patent
McConnell

(10) Patent No.: US 6,703,719 B1
(45) Date of Patent: Mar. 9, 2004

(54) SYSTEMS AND METHODS FOR MANAGING A BATTERY SOURCE ASSOCIATED WITH A MICROTURBINE POWER GENERATING SYSTEM

(75) Inventor: Robert W. McConnell, Rancho Palos Verdes, CA (US)

(73) Assignee: General Electric Company, Schenectady, NY (US)

(*) Notice: Subject to any disclaimer, the term of this patent is extended or adjusted under 35 U.S.C. 154(b) by 3 days.

(21) Appl. No.: 10/064,911

(22) Filed: Aug. 28, 2002

(51) Int. Cl.[7] ............................................. F02C 6/00
(52) U.S. Cl. ............................ 290/52; 363/35; 323/247
(58) Field of Search ........................... 290/52; 363/35; 323/261

(56) References Cited

U.S. PATENT DOCUMENTS

| | | | |
|---|---|---|---|
| 4,401,938 A | 8/1983 | Cronin .......................... 322/29 |
| 4,694,654 A | 9/1987 | Kawamura ........................ 60/7 |
| 4,745,755 A | 5/1988 | Kawamura .................... 60/608 |
| 4,754,607 A | 7/1988 | Mackay ......................... 60/723 |
| 4,757,686 A | 7/1988 | Kawamura et al. ............ 60/608 |
| 4,772,802 A | 9/1988 | Glennon et al. ............... 290/31 |
| 4,862,009 A | 8/1989 | King ............................. 290/22 |
| 4,886,978 A | 12/1989 | Kawamura .................... 290/52 |
| 4,908,565 A | 3/1990 | Cook et al. .................... 322/10 |
| 4,955,199 A | 9/1990 | Kawamura .................... 60/608 |
| 5,055,764 A | 10/1991 | Rozman et al. ................ 322/10 |
| 5,088,286 A | 2/1992 | Muraji ......................... 60/608 |
| 5,252,860 A | 10/1993 | McCarty et al. ........... 290/40 R |
| 5,323,613 A | 6/1994 | Akiyama ....................... 60/608 |
| 5,406,797 A | 4/1995 | Kawamura .................... 60/608 |
| 5,488,286 A | 1/1996 | Rozman et al. ................ 322/10 |
| 5,495,162 A | 2/1996 | Rozman et al. ................ 322/10 |
| 5,563,802 A * | 10/1996 | Plahn et al. ................. 700/297 |
| 5,589,743 A * | 12/1996 | King ........................... 318/139 |
| 5,903,116 A | 5/1999 | Geis et al. ..................... 318/14 |
| 6,064,122 A | 5/2000 | McConnell .................... 290/52 |
| 6,072,302 A * | 6/2000 | Underwood et al. .......... 322/17 |
| 6,081,104 A * | 6/2000 | Kern ........................... 323/268 |
| 6,118,678 A * | 9/2000 | Limpaecher et al. .......... 363/60 |
| 6,128,204 A * | 10/2000 | Munro et al. .................. 363/41 |
| 6,134,124 A * | 10/2000 | Jungreis et al. ............... 363/34 |
| 6,147,414 A | 11/2000 | McConnell et al. .......... 290/52 |
| 6,281,595 B1 * | 8/2001 | Sinha et al. ............. 290/40 A |
| 6,411,065 B1 * | 6/2002 | Underwood et al. .......... 322/20 |
| 6,487,096 B1 * | 11/2002 | Gilbreth et al. ............... 363/35 |

FOREIGN PATENT DOCUMENTS

| | | | | |
|---|---|---|---|---|
| EP | 0901218 A2 * | 10/1999 | | |
| FR | 2807884 A1 * | 10/2001 | ............. | H02J/9/06 |
| WO | WO 9932769 A1 * | 7/1999 | ............. | F02C/6/14 |

\* cited by examiner

*Primary Examiner*—Joseph Waks
(74) *Attorney, Agent, or Firm*—Sutherland Asbill & Brennan LLP

(57) ABSTRACT

A microturbine power generating system and associated method for managing a battery source associated with a microturbine power generating system is disclosed. The system and methods enable charging the battery source from the utility grid when the turbine is not running and providing load support when the microturbine engine is unable to support a transient load.

13 Claims, 4 Drawing Sheets

SYSTEMS AND METHODS FOR MANAGING A BATTERY SOURCE ASSOCIATED WITH A MICROTURBINE POWER GENERATING SYSTEM

BACKGROUND OF THE INVENTION

I. Field of the Invention

The present invention relates generally to microturbine power generating systems, and more particularly to managing a battery source associated with a microturbine power generating system.

II. Description of Related Art

The use of distributed generators for the production of electrical power has been increasing steadily over the last decade. In many parts of the world lacking an electric infrastructure (e.g., transmission and distribution lines), the commercialization of distributed generators has been greatly expedited since central plants will not only cost more per kilowatt, but will also need expensive infrastructure installed to deliver power to consumers of electricity. In the United States and other countries already having the electric infrastructure, the small, multi-fuel, modular distributed microturbine generation units will allow consumers of electricity to choose the correct method of electric service. The small, multi-fuel, modular distributed microturbine generation units will also allow consumers of electricity to choose the most cost-effective electric service.

Small, multi-fuel, modular distributed microturbine generation units could help alleviate current afternoon "brownouts" and "blackouts" that are prevalent in many parts of the world. For examples of microturbine power generating systems, see U.S. Pat. Nos. 4,754,607, 6,064,122 and 6,147,414, all of which are assigned to the assignee of the present invention. These microturbine power generating systems includes a turbine engine, a compressor and an electrical generator, with each device including a rotating component (e.g., a turbine wheel, a compressor wheel and a permanent magnet rotor).

Microturbine power generating systems such as the ones described in the '122 and '414 patents include an external battery source. The battery source is used at start up to power the electrical generator that turns the compressor until the turbine engine is capable if sustaining combustion. The '122 further discloses that the battery source can supply backup output power if the electrical generator experiences a failure. The charge on the battery source is typically maintained by charging the battery source with a portion of the output power when the microturbine generating system is operating. In order to maintain a sufficient charge, the turbine generating system may have run as often as several times a month, or more often in cold environments, which may be costly in terms of fuel consumption.

In addition, microturbine power generating systems have finite power limits defined by numerous factors such as the design of the turbine engine and the inverter. Thus, when a system is in normal operation and a large inductive load is added, the system may take several seconds to accelerate the turbine engine to a point that the demands of the additional load are met. While the impact of such a transient load can be reduced by using a microturbine power generating system with a higher power limit, this is often not a viable solution because systems with higher power limits usually cost more.

Thus, there exists a unsatisfied need in the industry for improved means for charging the battery source of a microturbine power generating system and for minimizing the impact of a transient load on the output of a microturbine power generating system.

SUMMARY OF THE INVENTION

The present invention provides systems and methods for managing a battery source associated with a microturbine power generating system, including charging the battery source from the utility grid when the turbine engine is not running and providing load support when the microturbine engine is unable to support the full load. The present invention may includes a battery charging circuit for controlling the charging of a battery source from the utility grid, a voltage boosting circuit for controlling the provisioning of load support and a controller for controlling the operation of the charging circuit and the voltage boosting circuit.

The battery charging circuit derives power to charge the battery source from either a utility grid connection or from the electric generator output. The charging source power is conditioned through an alternating current (ac) transformer and rectifier. The direct current (dc) output of the rectifier is supplied to a down chopper that provides a constant current to the battery source. The level of current is determined from sensors that measure battery temperature and voltage and is controlled by the controller. The characteristics of the battery and the temperature are used by the controller to set the charging current level and the maximum charging voltage. The same ac source can also be used to supply a thermostatically controlled heater for batteries that may be exposed to extremely low temperatures.

The voltage boosting circuit regulates the voltage of the battery source that is provided to a dc converter. The regulated output voltage can be used to either supply energy to start a microturbine engine or alternatively provide energy to support load demands when microturbine is not able. The controller uses a voltage regulator and current limiter to protect the battery and a battery voltage detector to prevent excessive discharge of the battery.

BRIEF DESCRIPTION OF DRAWINGS

Figure 1:
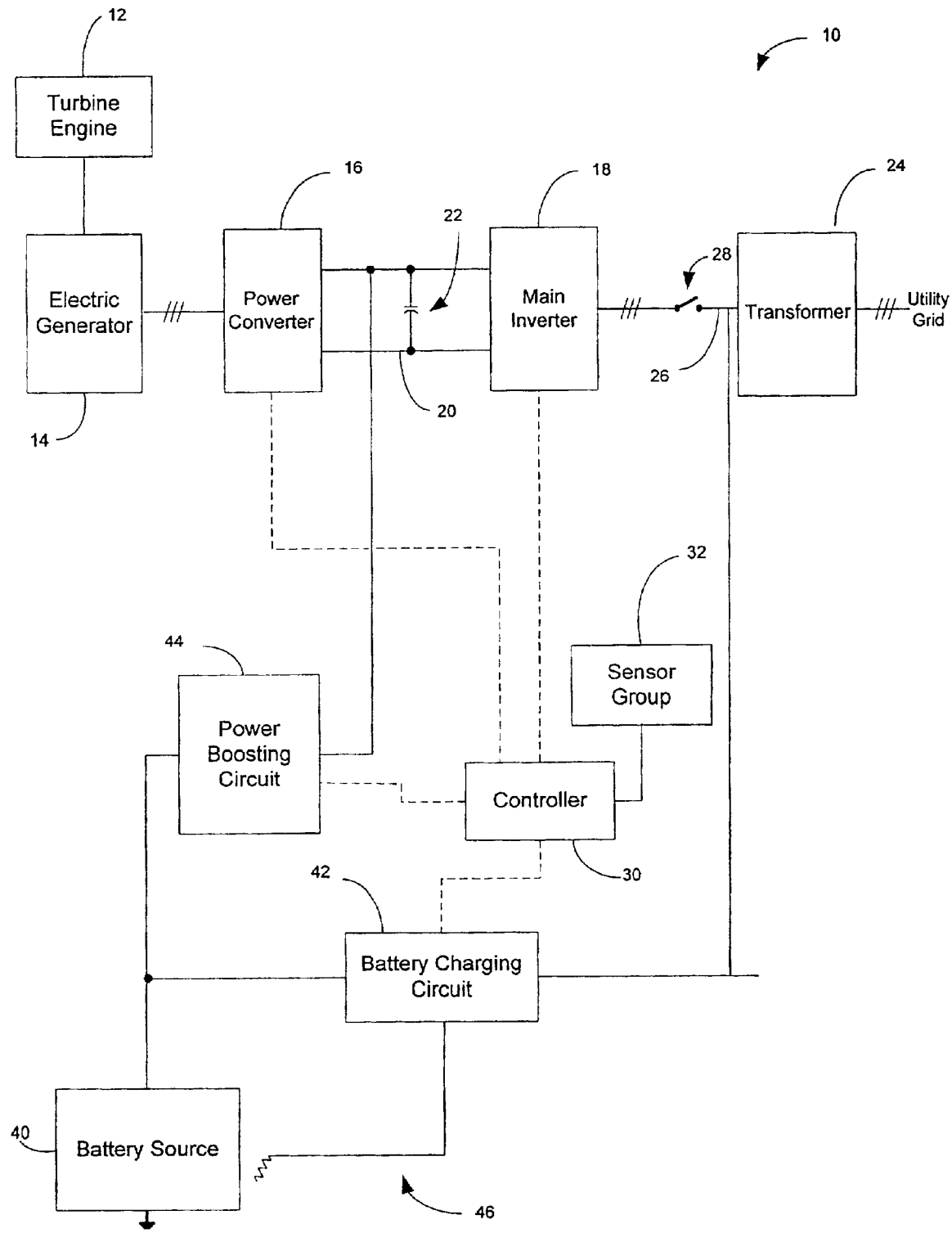

Having thus described the invention in general terms, reference will now be made to the accompanying drawings, which are not necessarily drawn to scale, and wherein:

FIG. 1 is a block diagram illustrating a microturbine power generating system in accordance with an embodiment of the present invention.

Figure 2:
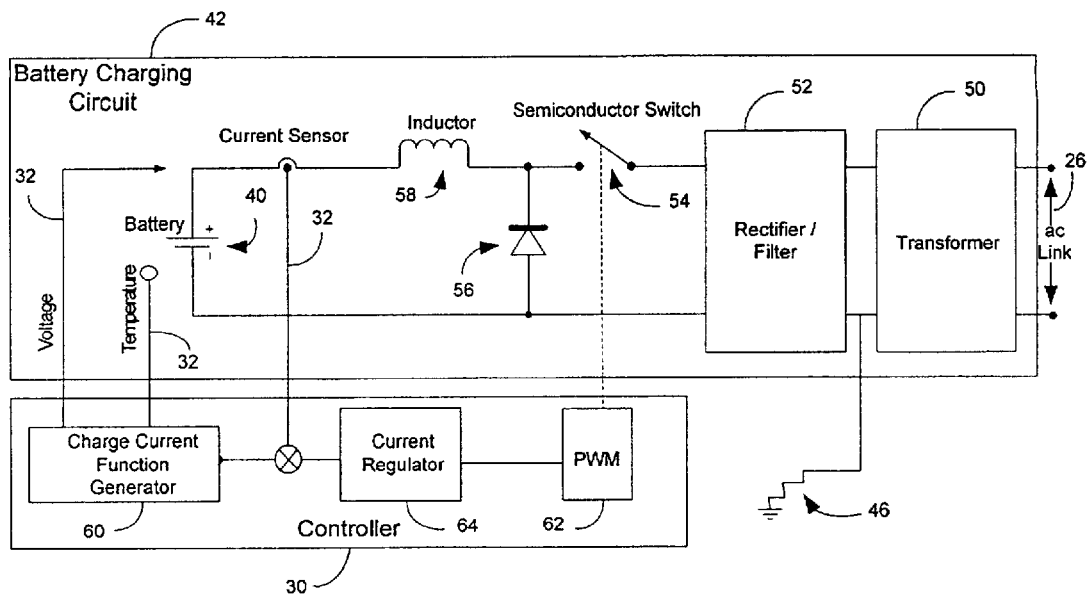

FIG. 2 is a block diagram illustrating a voltage boosting circuit of a microturbine power generating system in accordance with an embodiment of the present invention.

Figure 3:
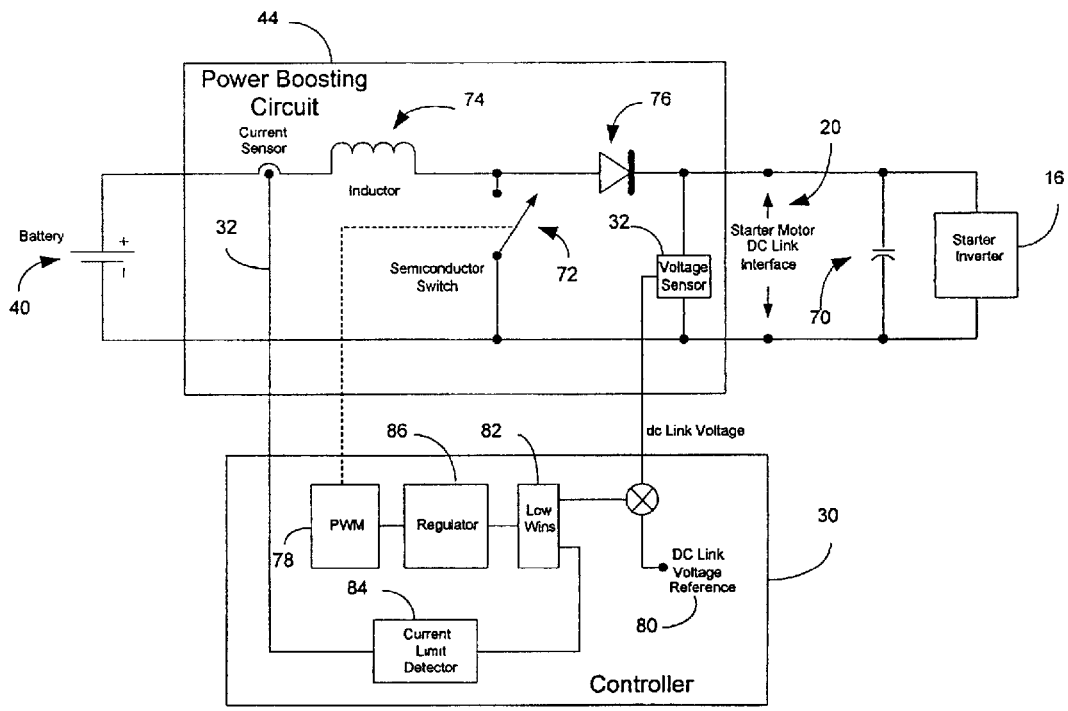

FIG. 3 is a block diagram illustrating a battery source charging circuit of a microturbine power generating system in accordance with an embodiment of the present invention.

Figure 4:
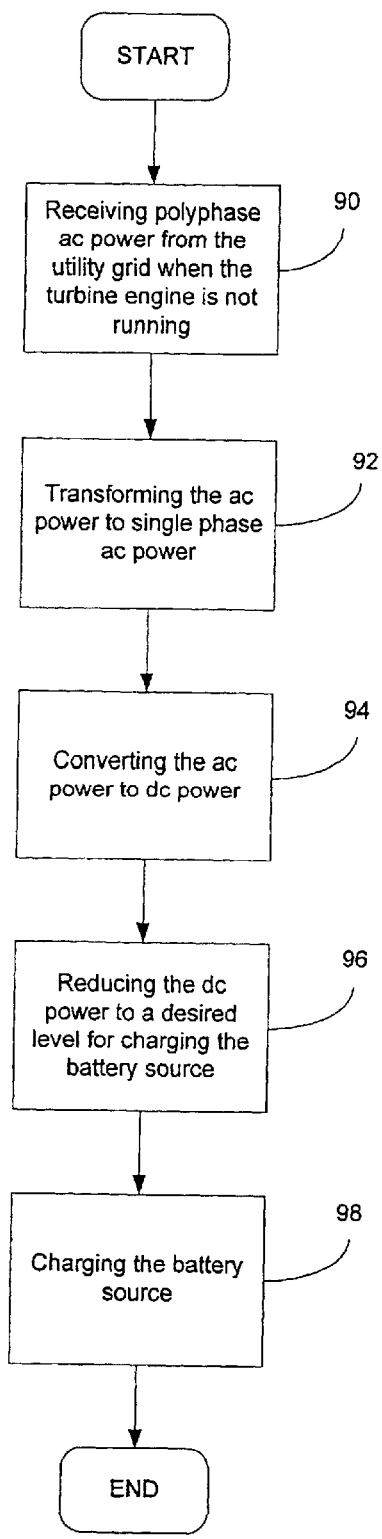

FIG. 4 is a flowchart of a method of charging a battery source of a microturbine power generating system in accordance with an embodiment of the present invention.

Figure 5:
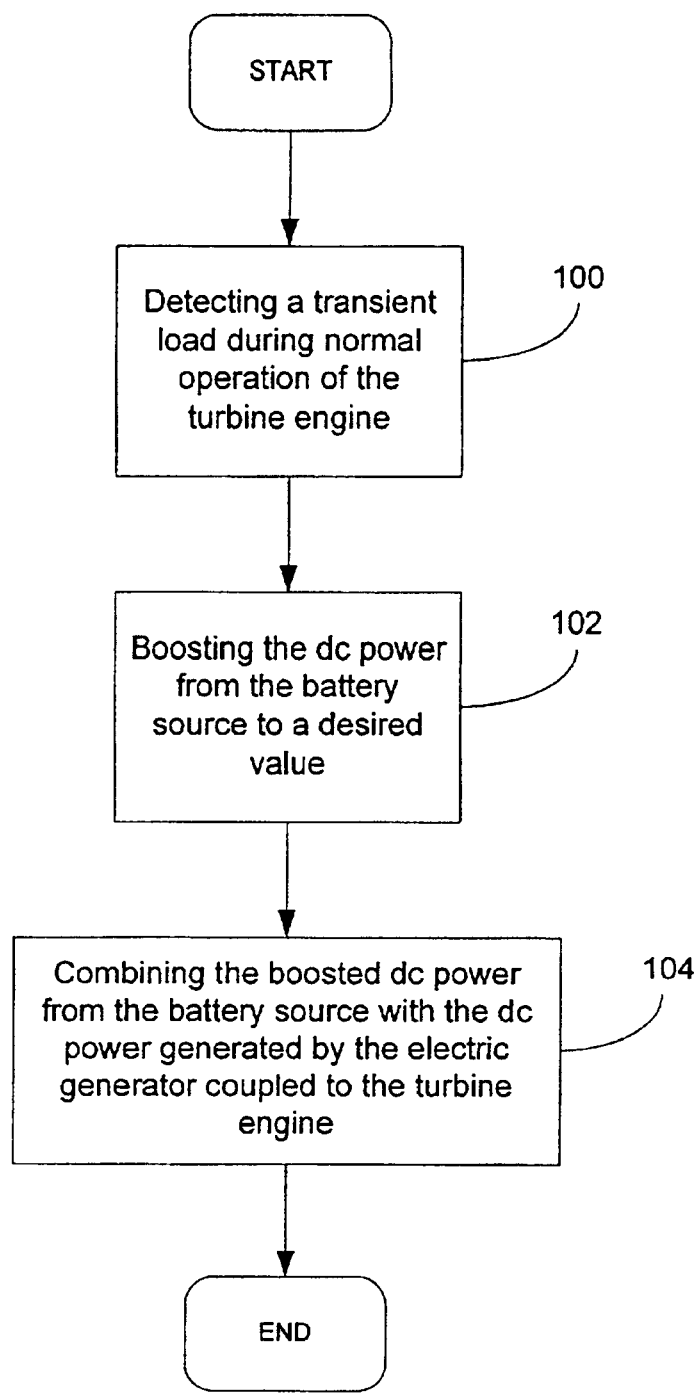

FIG. 5 is a flowchart of a method of transient load support using power from the battery source in a microturbine power generating system in accordance with an embodiment of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

With reference to the figures, FIG. 1 shows a microturbine power generating system 10 including a turbine engine 12 coupled to a electric generator 14. In a preferred embodiment, the generator 14 is a ring-wound, two-pole toothless (TPTL) brushless permanent magnet machine. The turbine engine and electric generator are preferably coupled by a common shaft to which the rotor of the electric generator and the turbine of the turbine engine are both attached. Thus, when the rotor is rotated by the rotation of the turbine of the rotating engine, an alternating current is induced in the stator windings of the electric generator. The speed of the turbine can be varied in accordance with external energy demands placed on the microturbine power generating system 10. Variations in the turbine speed will produce a variation in the frequency of the alternating current generated by the electrical generator 14. It should be noted at this point that other configurations of a turbine engine and electric generator can be utilized with the present invention to achieve the same advantages described herein.

The alternating current (ac) power from the electric generator 14 is rectified by a power converter 16 to direct current (dc), and the dc power is converted to fixed frequency ac power by a solid-state electronic inverter 18 (hereinafter the "main" inverter 18). The power converter 16 and main inverter 18 are coupled by a dc link 20, which includes a capacitor 22. The capacitor 22 filters averages out the voltage excursions on the DC link 20. The ac power output of the main inverter 18 is converted to a the utility grid voltage by a transformer 24. An ac link 26 couples the main inverter 18 and transformer 24. The ac link includes a selectable switch 28 that is closed during normal operation of the turbine engine and is open when the turbine engine is not running.

The selection of the power converter 16, main inverter 18 and transformer 24 allows for wide flexibility in determining the electric utility service to be provided to the utility grid by the power generating system of the present invention. Because any inverter can be selected, frequency of the ac power can be selected by the consumer. Likewise, the transformer 24 can be selected to provide the desired line-to-line output voltage (e.g., 208 V, 400 V, 415 V, 480 V or 600 V).

A controller 30 controls the turbine speed by controlling the amount of fuel provided to the turbine engine. The controller 30 uses sensor signals generated by a sensor group 32 to determine the external demands upon the microturbine power generating system 10 and then controls fuel flow to the turbine engine accordingly. The sensor group 32 includes one or more sensors such as turbine speed sensors and various voltage, current, temperature and pressure sensors for measuring operating parameters in the microturbine power generating system 10.

A battery source 40 is provided in combination with a battery charging circuit 42 and a voltage boosting circuit 44 to provide power for charging the battery source when the turbine engine is not running and for supporting transient loads, respectively. In addition, a heating system 46 is coupled to the battery charging circuit 42 to provide heat to the battery source 40, which may be desirable in cold climates. The heating system preferably includes a thermostat that controls the operation of a heating element to maintain a relatively constant battery temperature.

It will be appreciated that the battery source 40 and the voltage boosting circuit 44 are capable of providing power to startup the turbine engine, as generally described in U.S. Pat. No. 6,064,122. In particular, voltage from the battery is boosted by the voltage boosting circuit 44, the output of which is applied to the dc link 20. The dc power on the dc link is then converted by power converter 16 (operating as an inverter) to polyphase ac power which drives the electrical generator 14, which in turn drives the turbine engine 12 until it reaches a speed at which it can sustain combustion.

The controller 30 is in communication with the voltage boosting circuit 44 and the battery charging circuit 42 to monitor and control their operation as described herein. As will be appreciated by those of ordinary skill in the art, the controller 30 can be implemented in hardware as a circuit of discrete physical components or as software executed by a microprocessor or the like, or as a combination of hardware and software. In the preferred embodiment, the controller is implemented by a microprocessor executing special purpose software.

With reference now to FIG. 2, shown is an illustrative embodiment of the battery charging circuit 42 in accordance with the present invention for providing a regulated voltage source derived from the battery and boosted for use in starting the turbine engine or in supporting transient loads that the turbine engine 12 is unable to support alone. With regard to the use of the battery charging circuit 42 in providing additional output power in the event of a transient load, the battery charging circuit 42 operates as a down chopper, which draws some of the ac power on the ac link 26 when the turbine engine is not running and uses that current to charge the battery source 40. The switch 28, under control of the controller 30, is open when the turbine engine is not running so the electrical generator is isolated from the ac power on the ac link derived from the utility grid power. This is advantageous because the turbine engine does not have to startup each time the battery needs charging, which conserves fuel and may reduce wear and tear on the turbine engine and associated components.

Alternatively, when the switch 28 is closed, that is, when the turbine engine is running and providing power to the utility grid, the battery charging circuit can charge the battery source using some of the ac power generated by the electrical generator 14. Thus, in the following discussion of the operation of the battery charging circuit 42, the ac power on the ac link can advantageous be derived from the utility grid or the microturbine power generating system 10.

The battery charging circuit 42 receives ac power from the ac link 26 and a single phase transformer reduces the ac power, preferably to a range of 100–200 watts. The single phase transformer 50 is preferably a single phase 600 watt transformer, though transformers with different operating characteristics can be used in accordance with the present invention. These ratings are for typical turbogenerating systems in the range of 100 kilowatts (kW). Other system ratings and applications will require different values. The ac power out of the second transformer is then rectified by rectifier and filter 52. In addition, a small portion of the power at the output of the transformer 50 can be used to power the heating system 46 that warms the battery source. The voltage on the output of the rectifier and fitter 52 will usually be higher than the battery voltage so a switch 54 is pulse width modulated by the controller 30 so that the average voltage across the battery source 40 can properly charge the battery source 40. The battery charging circuit 42 also includes a diode 56 and an inductor 58. The inductor 58 serves as a current filter that limits the rate of current rise while the switch 54 is closed. The diode 56 provides a path for inductor current while the switch 54 is open. Thus, the battery charging circuit 42 allows the high-voltage battery source 40 to be charged conveniently.

The switch 54 is modulated at a fixed duty cycle. For example, in a preferred embodiment, the switch 54 is modulated at a duty cycle of 50% to allow a 300 volt battery to be charged by a rectifier and filter 52 that has an output voltage of 600 vdc. However, in alternative embodiments, a more elaborate scheme is used for controlling the charging rate of the battery source 40. For example, the battery source 40 is charged at a rate that is a function of parameters such as battery temperature, charging current and battery voltage. Signals indicating these parameters can be generated by the sensor group 32. The battery source voltage and temperature and processed by the charge current function generator 60 to determine at what current level to charge the battery so that the rate of charge is appropriate for the battery source used. The charge current level is a function of the charging characteristics of the battery source 40.

The controller 30 modulating the switch 54 at a fixed duty cycle via a pulse width modulator 62 according the desired charging rate. A current regulator 64 of the controller 30 monitors the charging current to ensure that the charging current does not exceed a threshold. If the charging current exceeds a threshold, then the controller 30 reduces the duty cycle until the current falls below the threshold. The controller 30 stops recharging the battery source 40 when the battery source 40, at a given temperature, reaches a certain battery voltage. The battery temperature may be measured inside the battery enclosure. The charging current may be measured by a current sensor attached to an upper conductor inside the battery source 40. Thus, the battery charging circuit 42 enables the battery source charge to be maintained when the turbine engine is not running.

With reference now to FIG. 3, shown is an illustrative embodiment of the voltage boosting circuit 44 in accordance with the present invention that provides a high voltage from a low voltage battery source for use starting the turbine engine or in transient load support. For example, the battery source 40 may include a single 48-volt battery or four 12-volt batteries connected in series. The 12-volt batteries, in an exemplary embodiment, are automotive batteries, which are commonly available as opposed to the large, high-voltage batteries. The battery source 40 alone does not provide sufficient voltage to motor the electrical generator 14 during startup or to assist in transient load support. However, the voltage boosting circuit operates as an up-chopper, which boosts the voltage from the battery source 40 to a level that is capable of motoring the electrical generator 14 or providing transient load support. For example, the voltage boosting circuit 44 may boost the voltage by a factor between five and fifteen.

In accordance with an aspect of the present invention, the voltage boosting circuit 44 is configured to provide load support when an additional load is added to the microturbine power generating system. In particular, the voltage boosting circuit 44 boosts the dc voltage from the battery source 40 so that the voltage on the dc link 20 is increased during periods when the turbine engine cannot handle the additional load. Previous designs provided a switch that would connect the up-chopper to either the electrical generator or the load (thereby disconnecting the electrical generator from the load), which prevented the use of battery source power while the turbine engine was generating output power for the load.

Thus, as aspect of the present invention is the ability for the voltage boosting circuit 44 to provide power to the dc link 20, which is then combined with power from the electric generator to support the load. The controller 30 monitors the dc link voltage and when it drops to a predetermined value, then the voltage boosting circuit applies a dc power derived from the battery source to the dc link to maintain the output level of the microturbine power generating system during the transient load while the turbine engine accelerates to a speed sufficient to carry the load.

The voltage boosting circuit 44 includes a capacitor 70 (which may be the same capacitor as capacitor 22), a switch 72, an inductor 74 and a diode 76. At the beginning of a transient load, the controller 30 detects a drop in the dc link voltage. The controller 30 then pulse width modulates the switch 72 via pulse width modulator 78, causing the switch 72 to open and close at a prescribed duty cycle. When the switch 72 is closed, energy from the battery source 40 is stored in the inductor 74. When the switch 72 is opened, energy is transferred from the inductor 74 to the capacitor 70. The diode 76 prevents the capacitor 70 from being discharged while the switch 72 is closed.

The controller 30 controls the rate at which the capacitor 70 is charged. The switch 72 may be modulated at a duty cycle that allows the capacitor 70 to be charged quickly when the voltage across the capacitor 70 is low. The switch 72 may be modulated at a duty cycle that allows the capacitor 70 to be charged at a trickle rate when the voltage across the capacitor 70 is high. Trickle-charging the capacitor 70 allows for the components (e.g., the diode 76 and the inductor 74) to be sized economically. Reducing component size reduces cost and temperature-related problems such as thermal cooling and component inefficiencies.

The controller 30 monitors both the dc link voltage and discharge current. The dc link voltage is compared to a reference voltage 80, and the difference (i.e., the voltage, error signal) is provided to a low wins function 82 (lower input value is transmitted to the device output). Likewise, a current Limit detector 84 monitors the discharge current to prevent the drain of too much current from the battery source, and generates an output signal (i.e., the current error signal) indicative of whether the discharge current is within acceptable parameters or if too much current is be drained from the battery source. The output signal of the current limit detector is also provided to the low wins function 82. The lower of the voltage error signal or the current error signal is provided to a regulator 86 that converts the signal into a control signal for the pulse width modulator 78. In operation, the voltage error signal controls, increasing the voltage boost until the discharge current reaches an predetermined value, at which point the current error signal takes over control to limit battery current even though it reduces the voltage boost.

With reference now to FIG. 4, shown is an illustrative method for charging a battery source. In accordance with an aspect of the present invention, the battery source of the microturbine power generating system is recharged using power from the utility grid. Initially, at Block 90, a polyphase as power is the received from the utility grid when the turbine engine of the microturbine power generating system is not running. In the illustrated embodiment of the present invention, the polyphase ac power is received from the ac link. At Block 92, the polyphase ac power is transformed into single phase ac power. The single phase ac power is then converted to dc power at Block 94, such as by a rectifier. The dc power is then reduced to an appropriate level for charging the battery source, as illustrated at Block 96. In the illustrated embodiment of the present invention, this is done with use of a down chopper circuit and controller so that the charging current is controlled. At Block 98, the battery is charged.

With reference now to FIG. 5, shown is an illustrative method for transient load support. In accordance with a aspect of the present invention, the battery source voltage is boosted for use in supporting a transient load on a microturbine power generating system. At Block 100, a transient load is detected during the normal operation of the turbine engine. In the illustrated embodiment of the present invention, this is accomplished by monitoring the dc link voltage. At Block 102, the dc power from the battery source is boosted to a desired voltage, such as by the use of an up-chopper circuit. The boosted dc power from the battery source and the dc power from the electrical generator are combine at Block 104 to support the transient load while the turbine engine accelerates to a speed sufficient to support the load with the assistance of the boosted battery power. Once the turbine engine has reach a sufficient speed, then the boosted battery power can be removed so as to conserve charge on the battery source.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A microturbine power generating system, comprising:
    a turbine engine for generating mechanical energy;
    an electrical generator that converts the mechanical energy produced by the turbine engine into electrical energy to be supplied to a utility grid;
    a battery source that provides dc power;
    a voltage boosting circuit coupled to the battery source, wherein the voltage boosting circuit increases a voltage of the battery source to produces a boosted dc power operable in a startup mode and a transient load mode;
    a power converter coupled to the electric generator and the voltage boosting circuit, wherein the power converter is operable to convert the boosted dc power from the voltage boosting circuit to ac power used to cause the electrical generator to turn the turbine engine in the startup mode, and to convert ac power from the electrical generator to dc power that is added to the boosted dc power from the voltage boosting circuit in the transient load mode;
    a main inverter coupled to the power converter by a dc link, wherein the main inverter converts dc power on the dc link into ac power;
    a transformer selectively coupled to the main inverter by an ac link, wherein the transformer couples the ac power output of the main inverter to the utility grid; and
    a battery charging circuit coupled to the ac link and the battery source, wherein the charging circuit converts ac power on the ac link to dc power to charge the battery source in a charging mode when the turbine engine is not generating mechanical power.

2. The system of claim 1, wherein the battery source includes a single battery for providing the dc power.

3. The system of claim 1, wherein the voltage boosting circuit boosts the voltage of the battery source by a factor ranging between about five and fifteen.

4. The system of claim 1, wherein the voltage boosting circuit includes a pulse-width modulatable energy storage unit for storing the dc power from the ac link, and wherein the system further comprises a controller for pulse width modulating the storage unit to boost the voltage.

5. The system of claim 1, further comprising a controller for controlling the voltage boosting circuit in the transient load mode.

6. The system of claim 1, wherein the battery charging circuit includes a down chopper that is responsive to the ac power from the utility grid in a charge mode, for providing dc power at a reduced voltage to the battery source.

7. The system of claim 6, wherein the battery charging circuit further comprises a second transformer coupled to the ac link and a second power converter for converting the ac power from the second transformer to dc power, wherein the dc power output of the second power converter is reduced by the down chopper for use in charging the battery source in a charge mode.

8. The system of claim 1, further comprising a controller for controlling the battery charging circuit in the charging mode.

9. The system of claim 8, wherein the battery source is recharged as a function of battery source voltage, battery charge current and battery source temperature.

10. The system of claim 8, wherein the battery charging circuit includes a second pulse-width modulatable power averaging unit for reducing the dc power from the second power converter, and wherein the system further comprises a controller for pulse width modulating the storage unit to reduce the voltage from the utility grid.

11. The system of claim 1, wherein the ac link between the main inverter and transformer is open in the charging mode.

12. The system of claim 1, wherein operation of the voltage boosting circuit is controlled by solid state switches.

13. The system of claim 1, wherein operation of the battery charging circuit (42) is controlled by solid state switches.

* * * * *